C. T. SHAFFER.

DUST CAP.

APPLICATION FILED APR. 10, 1917.

Reissued Dec. 24, 1918. 14,579.

WITNESSES:

René Bruint

T. F. Wallace,

INVENTOR

Cleve T. Shaffer

By Attorneys,

Fraser, Turk & Myers

UNITED STATES PATENT OFFICE.

CLEVE T. SHAFFER, OF SAN FRANCISCO, CALIFORNIA, ASSIGNOR, BY MESNE ASSIGNMENTS, TO A. SCHRADER'S SON, INCORPORATED, OF BROOKLYN, NEW YORK, A CORPORATION OF NEW YORK.

DUST-CAP.

14,579. Specification of Reissued Letters Patent. Reissued Dec. 24, 1918.

Original No. 1,191,840, dated July 18, 1916, Serial No. 761,295, filed April 15, 1913. Renewed February 15, 1916, Serial No. 78,550. Application for reissue filed April 10, 1917. Serial No. 161,003.

*To all whom it may concern:*

Be it known that I, CLEVE T. SHAFFER, a citizen of the United States, residing at San Francisco, in the county of San Francisco and State of California, have invented certain new and useful Improvements in Dust-Caps, of which the following is a specification, reference being had therein to the accompanying drawing.

The hereinafter described invention relates to improvements in dust caps as used in connection with the valve stems of pneumatic tires, and the invention has for its principal objects to provide an improved dust cap the employment of which will obviate the necessity of screwing the cap on and off of the valve stem as is now the custom; to provide a dust cap having yieldable means which is so arranged that when the cap is in position on the valve stem that the same will frictionally engage the stem and retain the protector thereon, and provide a hermetic seal around the valve stem; and to provide a dust cap which is simple in construction, consists of but few parts, and one which is thoroughly efficient for the purposes designed.

In vehicles where pneumatic tires are used the valve stem which is threaded for its full length extends through an opening in the felly and is retained in position therethrough by a threaded washer and is protected from the weather and injury by a threaded dust cap engaging the valve stem threads and screwed down on the stem for its entire distance and the operation of attaching and removing the cap and washer is tedious and slow owing to the necessity of threading the parts for the full length of the valve stem.

The present invention relates to improvements in devices for positioning over the valve stem to protect the same from injury and to retain the same in position, and one which may be quickly removed from or applied to the valve stem and without screwing the same for the full length thereof and when once in position on the valve stem will not shake loose.

With the above mentioned and other objects in view, the invention consists in the novel construction and combination of parts hereinafter described, illustrated in the accompanying drawings, and pointed out in the claims hereto appended; it being understood that various changes in the form, proportion, size and minor details of construction, within the scope of the appended claims, may be resorted to without departing from the spirit or sacrificing any advantages of the invention.

To more fully comprehend the invention, reference should be had to the accompanying sheet of drawings, wherein is disclosed one form of my invention, and in which—

Figure 1:
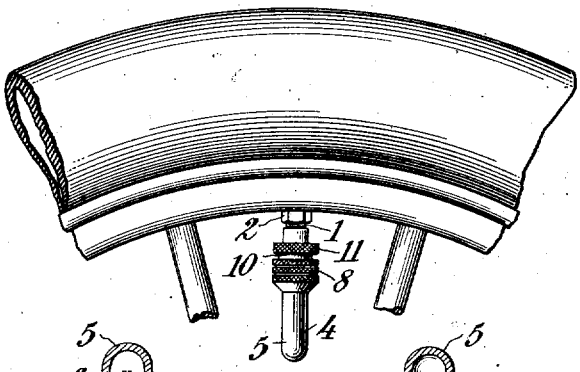
Figure 1 is a view in elevation of a section of a pneumatic tire with my improved dust cap positioned over the valve stem thereof.

Referring more particularly to the drawings, the reference numeral 1 designates the externally threaded valve stem of a pneumatic tire which is preferably retained in position through the felly by the nut 2 and is normally closed at its open end by the valve cap 3, of any well known type.

My improved dust guard comprises the elongated tubular receiving member or cap 4 closed at its upper end, as at 5, and formed at its opposite end with an outwardly flaring, inclined, annular flange wall 6, which terminates in an annular collar or sleeve 7 threaded on its lower inner surface and knurled on its outer surface, as at 8, the walls of the annular collar or sleeve being substantially parallel to the walls of the tubular member 4, and said cap is adapted for positioning over the upper portion of the valve stem 1. The threaded collar or sleeve 7 is adapted for receiving the upper exteriorly threaded portion 9 of an open ended tubular member or washer 10 formed with a knurled annular flange 11, and provided on its interior surface with an annular cutaway portion or seat 12 opening at the top of the member or washer 10.

A suitable flexible tubular packing or gripping member 13, preferably formed of rubber, is seated in the cutaway portion or seat 12, and the upper end 14 of said packing extends above the upper end of the member or washer 10, and is adapted when the members 4 and 10 are positioned over the valve stem and drawn together, to contact with the inner surface of the outwardly flaring flange wall 6 and be forced inwardly thereby, frictionally engaging the surface of the valve stem 1 retaining the members thereon and forming a hermetical seal around the valve stem to prevent the escape of any air from the valve stem, should the valve cap 3 become dislodged.

Figure 3:
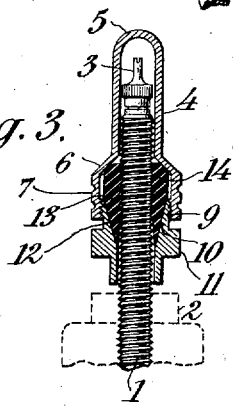
Fig. 3 is a vertical sectional view disclosing the manner of mounting and retaining the dust cap on the valve stem.
Figure 2:
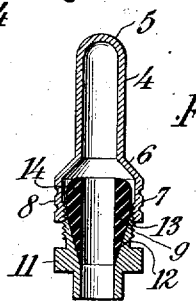
Fig. 2 is a vertical sectional view disclosing the two members forming the dust cap and the portion of flexible material interposed between and acted on by the members.

From the above description, it will be apparent that the members 4 and 10 when in slight threaded engagement do not force the packing 13 inwardly, as is shown in Fig. 2, and that the structure is capable of being readily positioned over and removed from the valve stem, but that when it is desired to prevent displacement of the structure from the valve stem it is only necessary to advance the members toward each other until such time as the upper end 14 of the packing contacts with the annular incline 6 which will force the packing inwardly against the valve stem 1 as in Fig. 3, and retain the dust guard in position. To remove the dust guard it is only necessary to give the members a slight twist which, through the threaded portions thereof, will cause the same to separate and the inclined flange wall 6 to disengage from the upper edge of the packing, which will permit the packing to assume the position as in Fig. 1, and admit of the dust guard being readily removed therefrom without the necessity of rotating the same for the full length of the valve stem as is the case with the structures now employed.

While the nut 2 is disclosed as having been positioned to secure the valve stem in place, it is to be understood that this nut may be dispensed with and the tubular member or washer may rest on the felly and in this way supplant the nut.

It will be observed that by my invention I have produced a quick detachable dust guard which can be applied to the valve stem and removed therefrom solely by manipulation of the cap portion, and that this can be done by the use of one hand. It is obvious that many changes can be made in the construction without departing from the broad principles of the invention.

Having thus described my invention what I claim as new and desire to protect by Letters Patent is:—

1. A quickly detachable dust guard for threaded valve stems comprising a tubular member for loosely positioning over the valve stem, a dust cap associated with said tubular member and adapted for loosely positioning over and for inclosing said stem, an annular flexible gripping member interposed between said tubular and dust cap members and through which said stem extends, and a means carried by said cap and tubular members whereby the same may by a relative rotary movement be drawn together for forcing said gripping member into engagement with the valve stem to detachably secure the tubular member and dust cap.

2. A quickly detachable dust guard for threaded valve stems comprising a tubular member for loosely positioning over the valve stem and through which the stem extends, a cap associated with said tubular member and adapted for loosely positioning over and for inclosing said stem, an annular flexible gripping member carried by one of said members and adapted to be engaged by the other of said members, and a threaded connection between said cap and tubular member whereby the same may by a relative rotary movement be drawn together for forcing said gripping member into engagement with the valve stem to detachably secure said tubular member and dust cap thereto and to provide a seal surrounding said stem below the open end thereof.

3. A quickly detachable dust guard for threaded valve stems, comprising a tubular member for loosely positioning over the valve stem and through which the stem extends, a dust cap associated with said tubular member and adapted for loosely positioning over said stem, an annular flexible gripping member carried by said tubular member and through which the valve stem extends, one end of said gripping member projecting beyond said tubular member, a threaded connection between said cap and tubular member for adjusting the same by a rotary movement relative to each other, and means carried by said cap for contacting with the projecting end of the said gripping member to force the same into engagement with the valve stem when the tubular member and cap are drawn together to detachably secure said tubular valve and dust cap to said stem.

4. A quickly detachable dust guard for threaded valve stems, comprising a tubular member or washer for loosely positioning over the valve stem and coöperating with the tubular member, and a flexible member within said dust cap, for engaging the valve stem to detachably secure the cap and tubular member or washer thereto on the drawing of said tubular member or washer and said dust cap together by a relative rotary movement thereof.

5. In combination with a valve threaded stem, coöperating tubular dust cap and washer members for simultaneous loose positioning over the valve stem, and a yieldable member adapted on the drawing together of said tubular dust cap and washer members upon a relative rotary movement thereof for engaging the valve stem to detachably secure said dust cap and washer members thereto.

6. A quickly detachable dust guard for threaded valve stems, comprising a yieldable member for loosely positioning over the valve stem, a tubular member or washer for loosely positioning over the valve stem and having an interior tapered surface for receiving said yieldable member, and a dust cap in coöperative relation with the tubular member or washer for loosely positioning over the valve stem and adapted by a relative rotary movement thereof on the drawing together of said tubular member or washer and said dust cap for forcing said yieldable member into engagement with the valve stem to detachably secure the dust cap and tubular member or washer thereto.

7. A quickly detachable dust guard for threaded valve stems, comprising a tubular member or washer and a coöperating dust cap member both adapted for loose positioning on the valve stem, a yieldable gripping member interposed between said mentioned members and forced into engagement with the valve stem by a relative rotary movement thereof and the movement toward each other of the tubular member and dust cap to detachably secure the dust cap and tubular member or washer thereto.

8. A quickly detachable dust guard for threaded valve stems, comprising a tubular member or washer and a coöperating dust cap adapted for loosely positioning over the valve stem, one of said members provided with an interior tapered portion, and a yieldable gripping member carried by the other member and adapted for engaging the valve stem to detachably secure the dust cap and tubular member or washer thereto on the relative rotary movement of said tubular member or washer and dust cap toward each other.

9. A quick detachable dust guard for threaded valve stems comprising a stem inclosing and dust excluding member into which the valve stem freely passes, an associated member through which the valve stem freely passes, and means operated by a relative rotary movement of the said two members for securing the guard on the valve stem.

10. In combination with a threaded valve stem, coöperating tubular dust cap and washer members for simultaneous loose positioning over the valve stem, and a yieldable member adapted on the drawing together of said tubular dust cap and washer members upon a rotary movement of the dust cap relative to the valve stem to detachably secure said dust cap and washer member thereto.

11. In combination with a threaded valve stem, coöperating tubular dust cap and washer members for simultaneous loose positioning over the valve stem and capable of movement toward each other, and a yieldable member within said dust cap member and coöperating with said washer member and adapted on the drawing together of said tubular dust cap and washer members upon a rotary movement of the dust cap relative to the valve stem to engage and detachably secure said dust cap and washer member to said stem.

12. A dust cap for tire valve stems or the like having a cap portion and a gripping portion adapted to be slipped over the valve stem, said gripping portion being operated to grip the valve stem by manipulation of the cap portion.

13. A dust cap for tire valve stems or the like having a cap portion and a gripping portion adapted to be slipped over the valve stem, said gripping portion being operated to grip and release the valve stem by manipulation of the cap portion.

14. A dust cap comprising a member adapted to contact with a fixed part whereby to oppose its movement, a cap portion adapted to be moved relatively to said first-named portion by manipulation of the cap when movement of the first-named portion is opposed by such fixed part, and means for gripping a tire valve or the like controlled by movements of the cap portion.

15. A dust cap comprising a bodily movable cap portion adapted for manipulation, a co-acting member adapted to contact with an independent portion of the wheel structure whereby to oppose its movements, said cap having means for gripping a valve stem upon manipulation of said cap portion whereby the cap may be tightened upon the stem by manipulating the cap portion solely.

16. A dust cap having a cap portion adapted to be bodily manipulated, a reaction member adapted to contact with a fixed part, and said cap having gripping means adapted to be brought into and out of contact with a valve stem when said cap portion is manipulated to move it relatively to said reaction member.

17. A dust cap having a cap portion, a foot portion and a flexible portion, each adapted to slip loosely over a valve stem, the foot portion extending below the cap portion, and adapted to contact with a fixed abutment such as a rim or rim nut, and said cap and foot portions being capable of a relative longitudinal movement to alter the length of the dust cap by manipulation of the cap portion, and said portions being adapted to force the flexible portion inwardly to engage the valve stem by such manipulation of the cap portion.

18. A dust cap having a cap portion, a foot portion and a flexible portion, each adapted to slip loosely over a valve stem, the foot portion extending below the cap portion, and adapted to contact with a fixed abutment such as a rim or rim nut, and said cap and foot portions being capable of a relative longitudinal movement to shorten the dust cap by manipulation of the cap portion in one direction and to lengthen it by a reverse manipulation, and said portions being adapted to force the flexible portion inwardly to engage the valve stem by such manipulation of the cap portion in one direction and to release the same by a reverse movement of the cap portion.

19. The combination of a cap portion adapted to slip loosely over a valve stem, a foot portion adapted to slip loosely over a valve stem, and to contact with an abutment such as a rim on the wheel, a flexible member adapted to fit loosely over a valve stem and to be forced inwardly to engage the valve stem, the cap portion and the foot portion being capable of a relative longitudinal movement by a manipulation of the cap portion, and the parts being formed to press the flexible member inwardly to engage the valve stem upon such longitudinal movement.

20. A dust cap having a cap portion, a member having a screwthreaded connection with said cap portion, and means for gripping a threaded valve stem, said means operated by a relative rotary movement of said parts.

21. A dust cap having a cap portion which is internally threaded, an annular member having a thread engaging that of the cap portion whereby relative rotation of said parts produces a relative longitudinal movement thereof, and gripping means adapted to engage a valve stem and disengage the same upon such longitudinal movements.

22. A dust cap having a body portion and having a screwthreaded connection with said body portion, one of said parts having an internal taper, and means for gripping a valve stem bearing against said taper and operated by relative rotary motion of said parts.

23. A combination with a valve stem and a cap therefor, comprising an upper member and a lower member adapted to be positioned upon the valve stem, with a flexible gasket interposed between the two members and adapted to be compressed inwardly against the wall of the valve stem by a relative rotary movement of the two members whereby to make a leak-tight joint between the cap and the valve stem.

CLEVE T. SHAFFER.